United States Patent [19]

Chambers

[11] Patent Number: 4,763,917
[45] Date of Patent: Aug. 16, 1988

[54] TRAILER COUPLER WITH IMPROVED BALL CLAMP HOLDING MEANS AND IMPROVED YOKE

[75] Inventor: James W. Chambers, Rockford, Ill.

[73] Assignee: Atwood Industries, Inc., Rockford, Ill.

[21] Appl. No.: 58,256

[22] Filed: Jun. 4, 1987

[51] Int. Cl.[4] .............................................. B60D 1/06
[52] U.S. Cl. ...................................... 280/507; 280/513
[58] Field of Search ................ 280/513, 512, 511, 507

[56] References Cited

U.S. PATENT DOCUMENTS 3,163,445 12/1964 Kirk et al. ............................ 280/513
3,467,409 9/1969 Unter ................................... 280/513
3,954,286 4/1976 Weber ................................. 280/512

Primary Examiner—John A. Pekar
Attorney, Agent, or Firm—Leydig, Voit & Mayer

[57] ABSTRACT

The ball clamp of a trailer coupler is supported by the coupler body to move back and forth between a clamped position holding a ballhead in the socket of the coupler and a released position permitting the socket to be pulled upwardly off of the ballhead. To hold the ball clamp in a correct angular orientation relative to the ballhead, a cylindrical tube is wedged between the upper side of the ball clamp and an inclined upper wall of the coupler body and is secured rigidly in place by staking metal of the side walls of the body into the end portions of the tube. The ball clamp is held in its clamped position by a pivoted yoke having transversely spaced arms which straddle the coupler body and having transversely spaced ears which straddle a latch. Each arm and each ear are integral with one another along a substantial length of the arm so as to improve the structural strength of the yoke.

6 Claims, 2 Drawing Sheets

TRAILER COUPLER WITH IMPROVED BALL CLAMP HOLDING MEANS AND IMPROVED YOKE

BACKGROUND OF THE INVENTION

This invention relates to a coupler for hitching a trailing vehicle to the spherical ballhead of a towing vehicle. More particularly, the invention relates to a coupler of the same general type as the coupler disclosed in Kirk et al U.S. Pat. No. 3,163,445.

Such a coupler includes a body whose forward end is formed with a downwardly opening socket for receiving the ballhead. The rear side of the socket is open and is adapted to be closed by a ball clamp which is supported on the coupler body to move back and forth between clamped and released positions. In its clamped position, the clamp engages the ball to lock the latter in the socket while still permitting relative turning and pivotal movement between the ball and the socket.

As a result of being supported to move back and forth relative to the body, the ball clamp also is capable of pivoting relative to the body about a transversely extending axis. In order to enable the ball clamp to properly engage the ball, it is necessary to locate the clamp in a predetermined angular position during assembly of the clamp and the body and to hold the clamp in such position over the service life of the coupler.

In the coupler disclosed in the Kirk et al patent, the ball clamp is located and then held in a predetermined angular position by a cam member located between the upper side of the ball clamp and a rearwardly and upwardly inclined upper wall of the coupler body. The cam member is supported by a bolt-and-slot connection which permits adjustment of the cam member and thus adjustment of the angular position of the clamp as wear occurs between the mating faces of the clamp and the ball.

Experience has shown that an adjustable connection between the cam member and the coupler body is not desirable since such a connection might result in the angular position of the ball clamp being improperly adjusted after the coupler has left the manufacturing facility. To avoid this, more recent couplers of the Kirk et al type has been manufactured with the cam member welded rigidly to the body after first having been located in the proper position. Welding of the cam member, however, is not easily achieved and, more importantly, it is difficult with mass production inspection techniques to verify that an adequate weld has been established.

A coupler of the type disclosed in the Kirk et al patent also includes a pivoted yoke for locking the ball clamp in its clamped position and for releasing the ball clamp for movement to its released position. The yoke includes a pair of transversely spaced arms which straddle the coupler body and also includes a pair of transversely spaced ears which straddle a latch for controlling the position of the yoke. The connection between the ears and the arms of the yoke is relatively weak and sometimes leads to failure of the coupler under extreme load conditions.

SUMMARY OF THE INVENTION

The general aim of the present invention is to provide a coupler having a new and improved clamp-locating wedge which may be more easily and reliably assembled with the coupler body than has been possible heretofore.

A more detailed object of the invention is to achieve the foregoing by providing a transversely extending cylindrical member adapted to be wedged between the ball clamp and the inclined upper wall of the coupler body and adapted to be easily staked to the side walls of the body.

The invention also resides in the novel manner in which the cylindrical member is staked to the side walls of the coupler body.

Another important object of the invention is to strengthen the connection between the arms and the ears of the yoke.

These and other objects and advantages of the invention will become more apparent from the following detailed description when taken in conjunction with the accompanying drawings.

DETAILED DESCRIPTION OF THE PREFERRED EMBODIMENT

Figure 1:
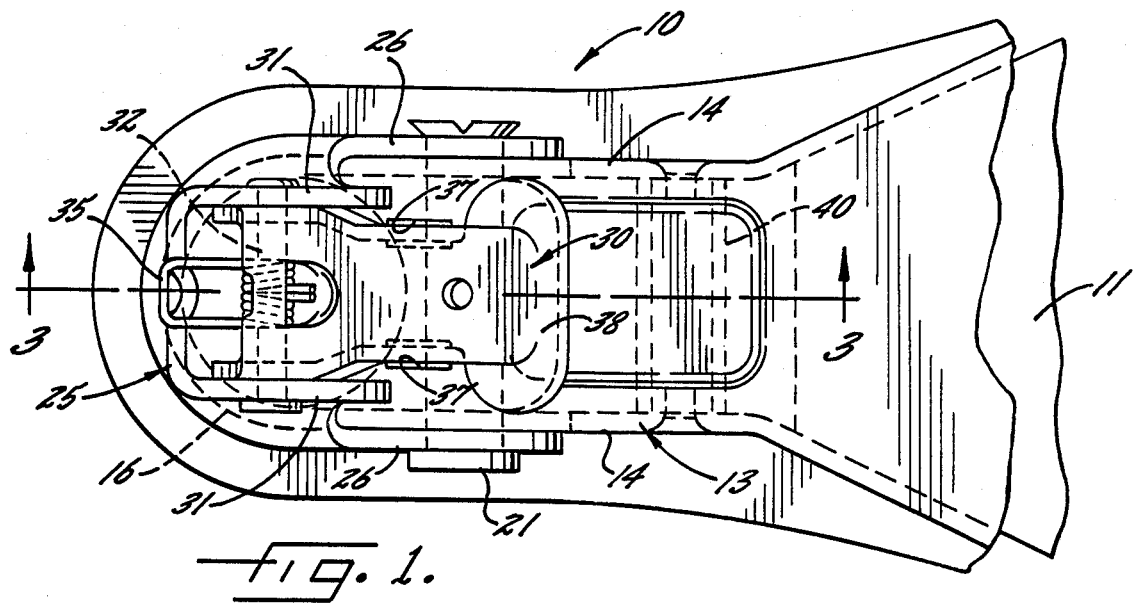
FIG. 1 is a fragmentary top plan view of a new and improved coupler incorporating the unique features of the present invention.

For purposes of illustration, the invention is shown in the drawings as embodied in a coupler 10 for hitching the front tongue 11 of a trailing vehicle to a spherical ballhead 12 on the rear of a towing vehicle. In many respects, the present coupler is similar to that of the aforementioned Kirk et al patent and thus certain parts of the coupler will be described only briefly.

The coupler includes a main body 13 made of heavy sheet metal and having a rear end portion adapted to be secured to the tongue 11 of the trailer. The body is of inverted U-shaped cross-section and is formed by two transversely spaced side walls 14 whose upper margins are integral with an inclined top wall 15 which slopes upwardly upon progressing rearwardly.

Figure 3:
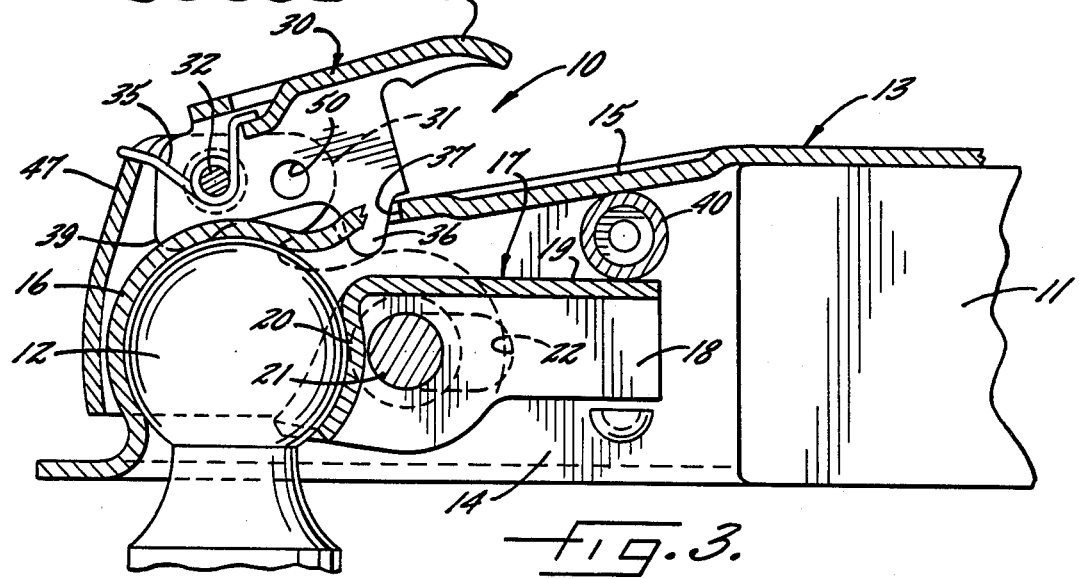
FIG. 3 is a fragmentary cross-section taken substantially along the line 3—3 of FIG. 1.

Formed on the forward end portion of the body 13 is a downwardly opening socket 16 which is shaped to receive and conform closely to the ball 12. The rear side of the socket 16 is open and is adapted to be selectively closed by a ball clamp 17. As shown most clearly in FIG. 3, the ball clamp 17 is located within the body 13 between the side walls 14 thereof and also comprises a member of inverted U-shaped cross-section. Thus, the ball clamp comprises two transversely spaced side walls 18 having upper margins formed integrally with a top wall 19 which is spaced below the inclined top wall 15 of the body 13. The forward end portion of the ball clamp includes a clamping plate 20 which is curved in accordance with the curvature of the ball 12 so as to enable the clamping plate to conform closely to the ball.

The ball clamp 17 is supported within the coupler body 13 to move back and forth between clamped and released positions. For this purpose, a cylindrical pin 21 extends transversely between the side walls 14 of the body 13 and is supported to slide back and forth in longitudinally extending slots 22 formed in the side walls. The pin also extends through circular holes formed in the side walls 18 of the ball clamp 17. When the pin 21 is slid forwardly in the slots 22, the clamping plate 20 of the ball clamp 17 engages the ball 12 to lock the ball in the socket 16 while still permitting relative turning and pivoting between the ball and the socket. Rearward sliding of the pin 21 in the slots 22 pulls the ball clamp 17 rearwardly to release the clamping plate 20 from the ball 12 and permit the socket 16 to be pulled upwardly from the ball.

To enable the ball clamp 17 to be shifted between its clamped and released positions, a U-shaped yoke 25 straddles the socket 16 and the forward portion of the body 13 and is formed with longitudinally extending arms 26 which straddle the side walls 14 of the body and which are pivotally supported on the end portions of the pin 21. When pivoted downwardly about the pin, the yoke engages the front side of the socket 16 and prevents the pin and the ball clamp 17 from moving rearwardly toward the released position of the clamp. Upon being pivoted upwardly, the yoke clears the socket and permits rearward movement of the clamp so as to free the socket from the ball 12.

The position of the yoke 25 is controlled by a latch 30. In the specific embodiment of the coupler shown in the drawings, the latch is straddled by a pair of transversely spaced ears 31 formed integrally with the forward portion of the yoke 25 and extending upwardly and rearwardly to a position above the socket 16. A pin 32 extends through transversely extending holes 33 (FIG. 4) in the ears and through alined holes in the latch 30 and supports the latch to pivot between latched and released positions about a transversely extending and horizontal axis. The latch is urged clockwise toward its latched position by a torsion spring 35 (FIG. 3) supported on the pin 32 and having tangs which bear against the latch and the yoke 25.

Figure 2:
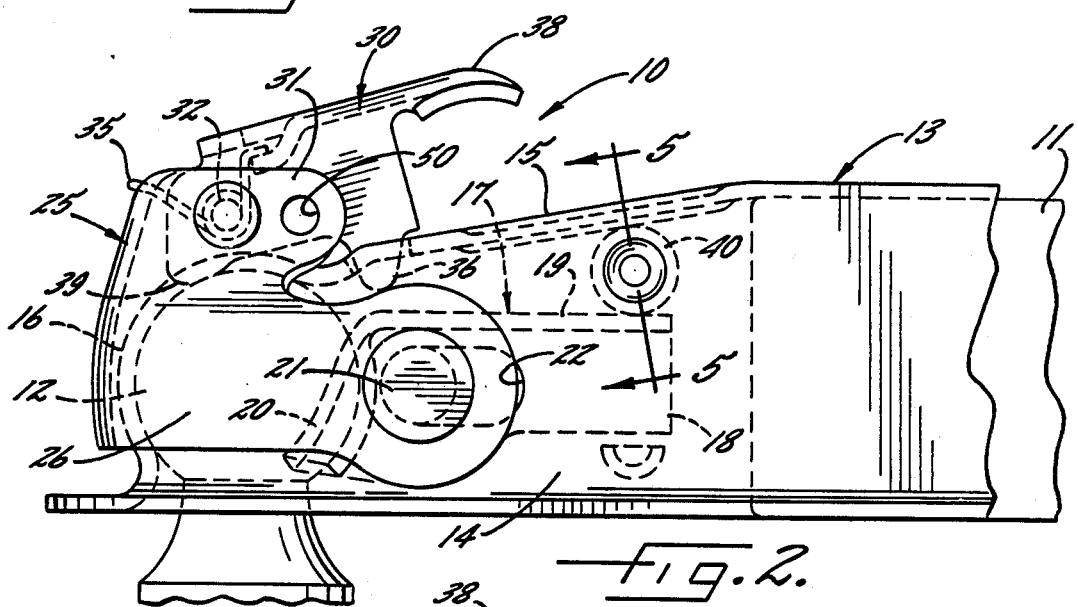
FIG. 2 is a fragmentary side elevational view of the coupler.

Formed on the lower rear portion of the latch 30 are two transversely extending teeth 36 (FIG. 3) which normally extend downwardly into two transversely spaced slots 37 formed in the top wall 15 of the coupler body 13. As long as the teeth are in the slots, the yoke 25 is prevented from pivoting upwardly about the pin 27 and thus keeps the ball clamp 17 in its clamped position. By pulling upwardly on a handle 38 on the rear of the latch 30, the teeth 36 may be pulled upwardly out of the slots 37 and, at the same time, cams 39 (FIG. 2) on the latch engage the top of the socket 16 to swing the yoke 25 upwardly and permit rearward movement of the ball clamp 17 to its released position. Reference may be made to the aforementioned Kirk et al patent for a more detailed disclosure of the construction and operation of the latch.

Because the ball clamp 17 is supported on the pin 21 to move between clamped and released positions, the clamp also has the tendency to pivot about the axis of the pin. It is important, however, to hold the clamp in a predetermined angular orientation and to prevent the clamping plate 20 from pivoting counterclockwise out of proper engagement with the ball 12.

In accordance with one aspect of the present invention, a cylindrical member 40 (FIGS. 3 and 5) extends transversely between the side walls 14 of the coupler body 13 and wedges between the upper wall 19 of the clamp 17 and the upwardly and rearwardly inclined wall 15 of the body so as to first locate the clamp in a proper angular orientation at the manufacturing facility and thereafter to hold the clamp in the same angular orientation over the service life of the coupler. In the present instance, the cylindrical member 40 is in the form of a cylindrical tube made of hardened steel.

After the ball clamp 17 has been assembled with the coupler body 13, the socket 16 is placed over a fixtured ball of the same diameter as the actual ballhead 12. The ball clamp 17 then is moved forwardly to a position in which the clamping plate 20 engages the ball and is oriented angularly such that the clamping plate conforms closely to the spherical surface of the ball but not so tightly as to prevent the socket for turning and pivoting on the ball. The cylindrical tube 40 then is moved forwardly in the space between the inclined top wall 15 of the body 13 and the top wall 19 of the clamp 17 until further movement of the tube is stopped by virtue of the tube wedging tightly between the two walls. While in this position, the tube is secured rigidly to the coupler body 13 and, as an incident thereto, permanently holds the ball clamp 17 in the correct angular position established during assembly.

Figure 5:
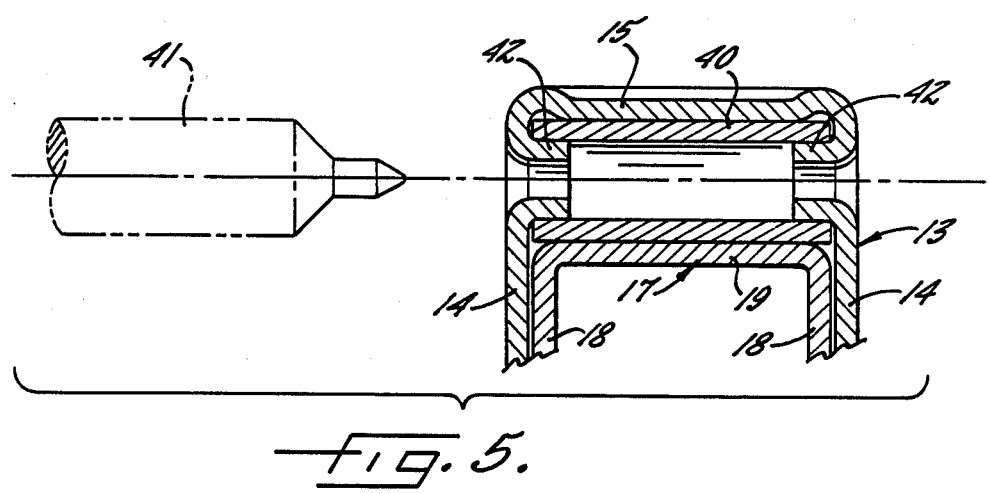
FIG. 5 is an enlarged fragmentary cross-section taken substantially along the line 5—5 of FIG. 2.

Preferably, the tube 40 is secured to the coupler body 13 by using a punching tool 41 (FIG. 5) to pierce each side wall 14 and to swage a portion of the side wall into tight telescoping engagement with the end portion of the tube. Thus, as shown in FIG. 5, tubular portions 42 of the side walls 14 are swaged into a tight press fit relationship with the end portions of the tube 40 so as to hold the tube rigidly and permanently in its pre-established position. Because no welds are involved, assembly and inspection of the tube-type wedge are facilitated and, in addition, there are fewer rejects.

According to another aspect of the invention, the yoke 25 is constructed so as to possess significantly greater structural strength than the yokes of prior couplers. For this purpose, the ears 31 of the yoke are disposed in straddling relation with the latch 30 and are constructed such that the lower margins 45 (FIG. 4) of the ears are integral with the upper margins of the arms 26 from a point extending from the extreme front margins 46 of the ears to a point located well rearwardly of the holes 33 for the pin 32. As a result of the solid and continuous integral joint between the ears 31 and the arms 26, the ears are less susceptible to failure and, in addition, the upper front portion 47 (FIG. 4) of the yoke is connected solidly both to the ears and the arms and is structurally much stronger than the narrow neck which exists at the upper front portion of the yokes of prior couplers.

Figure 4:
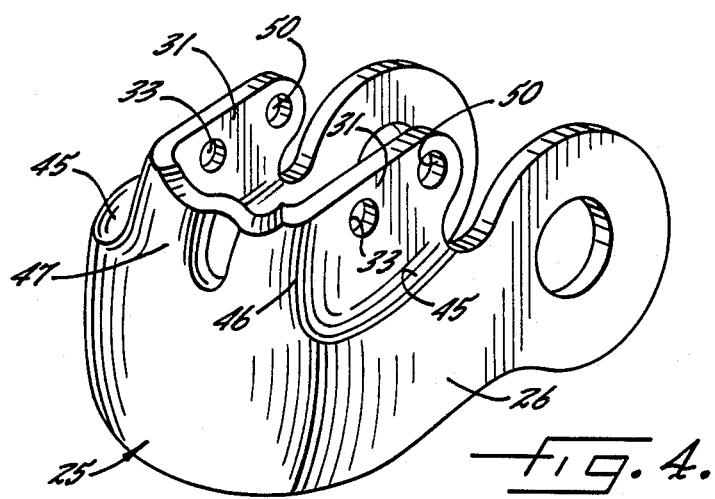
FIG. 4 is a perspective view of the yoke of the coupler.

As shown most clearly in FIG. 4, two additional transversely exfending holes 50 are formed through the ears 31 at points located rearwardly of the holes 33. When the latch 30 is in its latched position, the holes 33 aline with holes in the latch and are adapted to receive the shackle of a padlock (not shown) for locking the latch in its latched position. As a result of the holes 50 through the ears 31, there is no need to weaken one of the side walls 14 of the body 13 with a hole for receiving the padlock shackle.

I claim:

1. A coupler for hitching a trailing vehicle to a towing vehicle having a ballhead thereon, said coupler comprising a body having forward and rear end portions, a downwardly opening socket at the forward end portion of said body for receiving said ballhead, said socket having an open rear side, a ball clamp supported on said body to slide back and forth between clamped and released positions, said ball clamp being operable when in said clamped position to close the rear side of said socket and lock said ballhead in said socket and being operable when in said released position to permit said socket to be pulled upwardly off of said ballhead, said body having an inclined upper wall which slopes upwardly upon progressing rearwardly, said ball clamp having a generally horizontally extending upper side spaced below said upper wall, and a transversely extending cylindrical member secured rigidly to said body and wedged between the inclined upper wall of said body and generally horizontal upper side of said clamp to hold said clamp in a predetermined angular orientation when said clamp is in said clamped position.

2. A coupler as defined in claim 1 in which said cylindrical member is tubular.

3. A coupler as defined in claim 2 in which said body includes upright side walls located at the ends of said cylindrical member, a portion of each side wall being staked inwardly into the adjacent end portion of said cylindrical member so as to secure said cylindrical member rigidly to said body.

4. A coupler as defined in claim 3 in which each of said side wall portions is tubular.

5. A coupler for hitching a trailing vehicle to a towing vehicle having a ballhead thereon, said coupler comprising a body having a top wall, having transversely spaced side walls depending from said top wall, and having forward and rear end portions, a downwardly opening socket at the forward end portion of said body for receiving said ballhead, said socket having an open rear side, a ball clamp supported on said body to slide back and forth between clamped and released positions, said ball clamp being operable when in said clamped position to close the rear side of said socket and lock said ballhead in said socket and being operable when in said released position to permit said socket to be pulled upwardly off of said ballhead, a yoke mounted on said body to swing upwardly and downwardly between lowered and raised positions, said yoke being connected to said ball clamp and being operable when in said lowered position to engage the forward side of said socket and prevent said ball clamp from shifting rearwardly to said released position, said yoke releasing said socket upon being swung upwardly to said raised position thereby to permit said ball clamp to move rearwardly to said released position, a latch located above the top wall of said body and pivotally mounted on said yoke to turn about a transversely extending horizontal axis between latched and unlatched positions, said latch engaging said top wall when in said latched position and preventing said yoke from being swung upwardly to said raised position, said latch releasing said top wall when in said unlatched position and permitting said yoke to swing upwardly to said raised position, said yoke comprising a pair of transversely spaced arms straddling the side walls of said body and comprising a pair of transversely spaced ears located above said arms and straddling said latch, said ears being formed with alined transversely extending holes defining the pivot axis of said latch, and each ear having a lower margin which is integral with the upper margin of the respective arm from a point located at the front of the ear to a point located rearwardly of the hole in the ear.

6. A coupler as defined in claim 5, in which each ear includes an additional transversely extending hole located rearwardly of said one hole and adapted to receive the shackle of a lock.

* * * * *